US006567195B1

(12) United States Patent
Ford et al.

(10) Patent No.: US 6,567,195 B1
(45) Date of Patent: May 20, 2003

(54) OPTICAL NETWORK USING REMOTE OPTICAL POWERING OF OPTOELECTRONIC SWITCH

(75) Inventors: Joseph Earl Ford, Oakhurst, NJ (US); Wayne Harvey Knox, Holmdel, NJ (US); Ashok V. Krishnamoorthy, Middletown, NJ (US); Martin C. Nuss, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/335,334

(22) Filed: Jun. 17, 1999

(51) Int. Cl.$^7$ ............................................... H04B 10/24
(52) U.S. Cl. ........................................ 359/118; 359/159
(58) Field of Search .................. 359/152, 155, 359/173, 181, 168, 118, 159; 385/16, 147

(56) References Cited

U.S. PATENT DOCUMENTS

| 4,642,804 A | * | 2/1987 | Personick | 359/114 |
| 4,879,763 A | * | 11/1989 | Wood | 359/112 |
| 5,408,350 A | * | 4/1995 | Perrier et al. | 359/113 |
| 5,777,318 A | * | 7/1998 | Krishnamoorthy et al. | 250/214 LS |
| 5,912,751 A | * | 6/1999 | Ford et al. | 359/117 |

OTHER PUBLICATIONS

A. Krishnamoorthy et al, "Vertical–Cavity Surface–Emitting Lasers Flip–Chip Bonded to Gigabit–per–Second CMOS Circuits," IEEE Photonics Letters, vol. 11, No. 1, Jan. 1999, pp 128–130.

A. Krishnamoorthy et al, "Optoelectronic–VLSI: Photonics Integrated with VLSI Circuits," IEEE Journal of Selected Topics in Quantum Electronics, vol. 4, No. 6, Nov./Dec. 1998, pp 899–912.

A. Krishnamoorthy et al, "Dual–Function Detector–Modulator Smart–Pixel Module," Applied Optics, vol. 36, No. 20, Jul. 10, 1997, pp 4866–4870.

K. W. Goosen et al "On the Tolerance and Manufacturing Tolerances of GaAs–AlAs MQW Modulators," IEEE Journal of Quantum Electronics, vol. 34, No. 3, Mar. 1998, pp 431–438.

* cited by examiner

Primary Examiner—Leslie Pascal
Assistant Examiner—Dalzid Singh
(74) Attorney, Agent, or Firm—John A. Caccuro

(57) ABSTRACT

An optical local area network uses modified remote network interface cards (NICs) to provide an optical carrier signal for signaling use by a centralized optoelectronic switch unit. The NIC optical transceiver is modified so that instead of being normally "off" during the standby mode, the data signal is logically inverted to be "on." Light from each NIC is used to provide optical power for a corresponding optical modulator on the switch unit.

17 Claims, 5 Drawing Sheets

US 6,567,195 B1

OPTICAL NETWORK USING REMOTE OPTICAL POWERING OF OPTOELECTRONIC SWITCH

TECHNICAL FIELD OF THE INVENTION

This invention relates to optical communication systems and, more particularly, to a method of and apparatus for enabling the remote optical powering of an optoelectronic switch.

BACKGROUND OF THE INVENTION

A network of desktop computers can be connected with Gigabit Ethernet transmitted over multimode optical fibers. As shown in FIG. 1, using the present standard approach, each computer 100 has a network interface card (NIC) 101 with an optical transceiver 102 (laser transmitter and optical receiver) connected over a pair of optical fibers 103 to a central switch or hub unit 104. Since a number of computers (typically 12 or more) can be connected to the switch unit 104, a corresponding number of optical transceivers 105 is needed to interface to the optical fibers 103. These transceivers 105 represent a significant portion of the cost and bulk of the switch unit 104 and act as a limitation on the number of optical input/output data (I/O) networks which can be supported by the switch unit 104.

Optoelectronic devices with integrated silicon electronics accommodate large numbers of optical inputs and outputs and offer potential size and cost reductions for optical data network applications. In particular, optoelectronic chips with over 4000 optical modulators and detectors have been demonstrated. Optoelectronic integrated circuit chips with vertical cavity surface emitting lasers (VCSELs) have recently been described in reference [1], however, this technology is significantly behind modulator integration in terms of the number of devices on a chip and the device yield as described in reference [2]. (In this specification, a reference is designated by a number in brackets to identify its location in a list of references found in the Appendix)

Therefore what is needed is an arrangement in which multiple optical transceivers can be integrated onto a single optoelectronic chip to accommodate large number of optical inputs and outputs at the switch unit.

SUMMARY OF THE INVENTION

In accordance with the method and apparatus of our invention, an optical communication network includes remote units which each provide an optical carrier signal which is used for signaling by a centralized optoelectronic switch. The remote units include a standard network interface card (NIC) with an optical transceiver which is slightly modified so that instead of being normally "off" during the standby mode, the data signal is logically inverted to be "on." The light from each NIC is used to provide optical carrier signal for a corresponding optical modulator at the switch unit. This eliminates the requirement for integrating vertical cavity surface emitting lasers (VCSELs) or light emitting diodes (LEDs) on an optoelectronic switch chip at the switch unit.

More particularly, in accordance with my invention, an optical communication network comprises a plurality of remote optical transceiver units connected over a plurality of optical fibers to an optoelectronic switch unit. Each remote optical transceiver unit includes an optical signal source for transmitting a modulated optical upstream signal to the optoelectronic switch during a transmit mode, and during a standby mode transmitting an optical carrier signal. The optoelectronic switch includes a plurality of local transceivers, each local transceiver operating as a receiver during the transmit mode to receive the upstream optical signal over an optical fiber from one of the plurality of remote optical transceiver units and operating as a modulator during the standby mode to modulate a received optical carrier signal and transmitting the modulated downstream optical signal back to that one of the plurality of remote optical transceiver units.

In accordance with one feature of the invention, each local transceiver includes a multiple quantum well (MQW) device which is switchable for use as a modulator and as a detector. According to another feature each MQW device is made part of a Very Large Scale Integrated (VLSI) circuit.

BRIEF DESCRIPTION OF THE DRAWINGS

In the drawings.

In the following description, identical element designations in different figures represent identical elements. Additionally in the element designations, the first digit refers to the figure in which that element is first located (e.g., 302 is first located in FIG. 3).

DETAILED DESCRIPTION

Figure 2A:
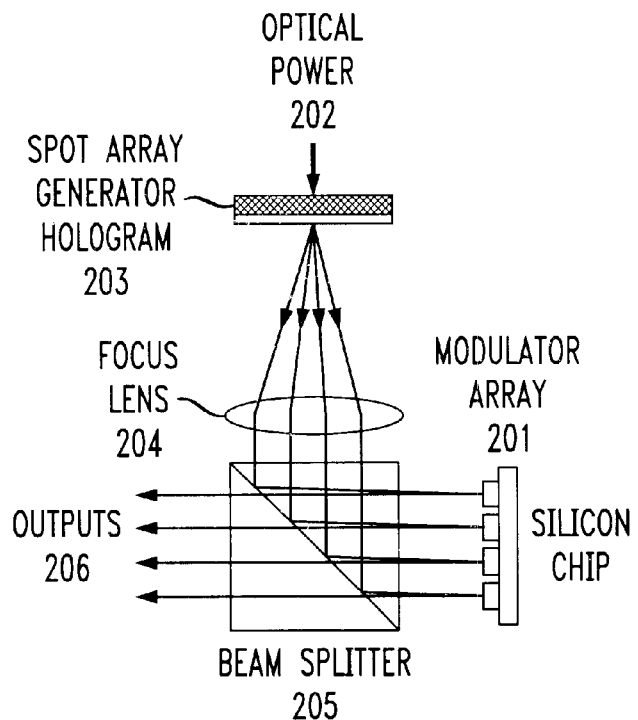
FIG. 2 shows an illustrative diagram of a modulator-based (FIG. 2a) and an emitter-based (FIG. 2b) optoelectronic device.
Figure 2B:
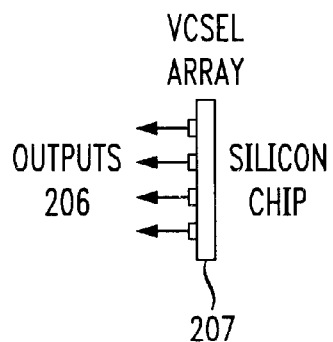

FIG. 2 compares the optical packaging of an illustrative modulator-based (FIG. 2a) and an emitter-based (FIG. 2b) optoelectronic device which may be integrated onto an optoelectronic-very large scale integrated (OE-VLSI) circuit for use at the switch unit 104. In FIG. 2a, the transmitter used in an optoelectronic device is an optical modulator array 201 (e.g., a multiple quantum well (MQW) or a micromechanical (MM) device) which modulates the reflected power of an externally-generated optical source 202. The optical power beam 202 is transmitted though a holographic spot array generator 203 and focused by lens 204 onto each of N modulators on modulator array 201 through a cube beamsplitter 205, so that the reflected output light beams 206 carry the modulated signal.

FIG. 2b shows the same light output 206 being generated from light emitters implemented as part of a light emitting diode (LED) array or as a vertical cavity surface-emitting lasers (VCSEL) array 207. Clearly, as shown, the LED or VCSEL array 207 of light emitters require less complicated packaging than the MQW or MM modulator array 201. However, the fabrication of arrays of LED or VCSEL 207 has proven to be much more difficult than the fabrication of a MQW or MM modulator array 201. Fabrication of a VCSEL array 207 with sufficient yield for manufacturing is even more difficult, especially when this low-yield component is to be combined with a high-cost silicon chip.

Figure 3:
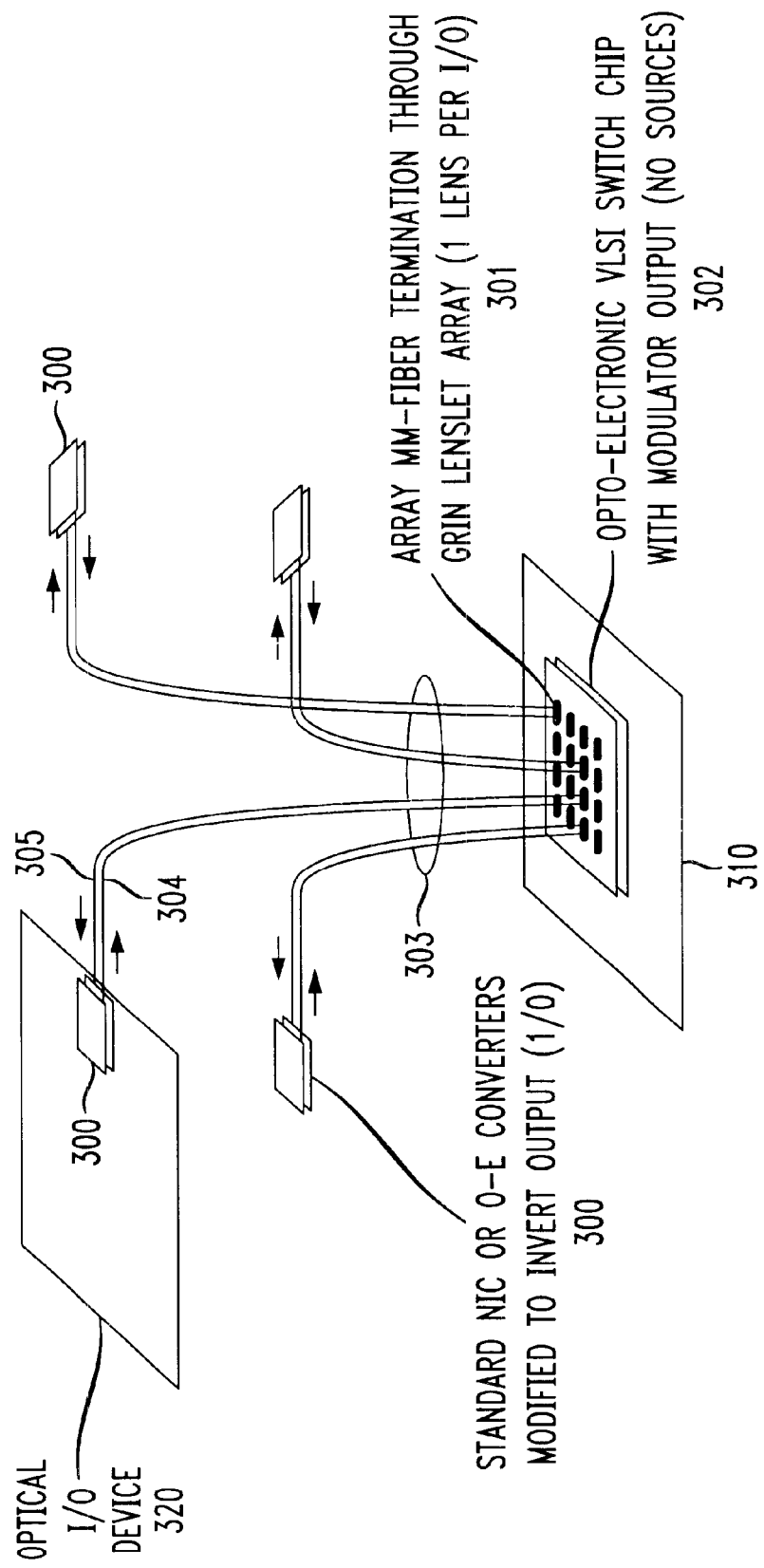
FIG. 3 shows an illustrative diagram of an optical LAN, in accordance with the present invention, which uses each optical transceiver unit to provide an optical carrier signal for an optical modulator at the switch unit.

With reference to FIG. 3 and in accordance with the present invention, we describe a technique for the packaging of high yield modulator optoelectronics at the switch unit 310 which use each of the light emitters in the transceivers 300 of the NIC cards as an optical carrier signal source for driving the corresponding modulator optoelectronics at the switch unit. As shown, our optical LAN uses the optical light signal from each optical transceivers unit 300 at a network interface card (NIC) to power an optical modulator device, e.g., 301, of an optical transceiver integrated onto an OE-VLSI circuit chip 302 of the central switch unit 310.

Figure 1:
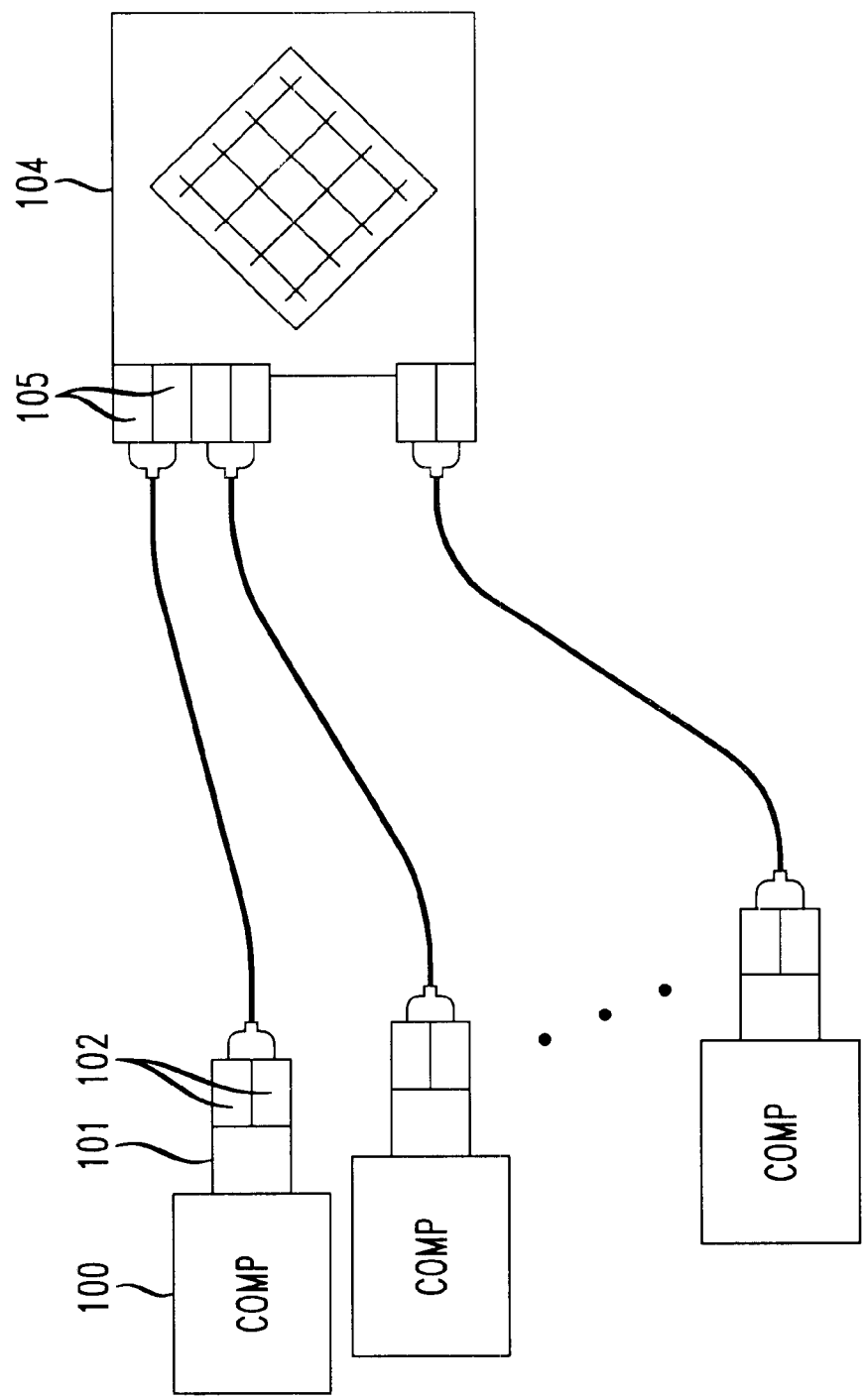
FIG. 1 shows an illustrative block diagram of a prior art optical local area network (LAN) including a plurality of network interface cards (NICs), each with an optical transceiver unit, connected over a pair of optical fibers to a central switch/hub unit.
Figure 4:
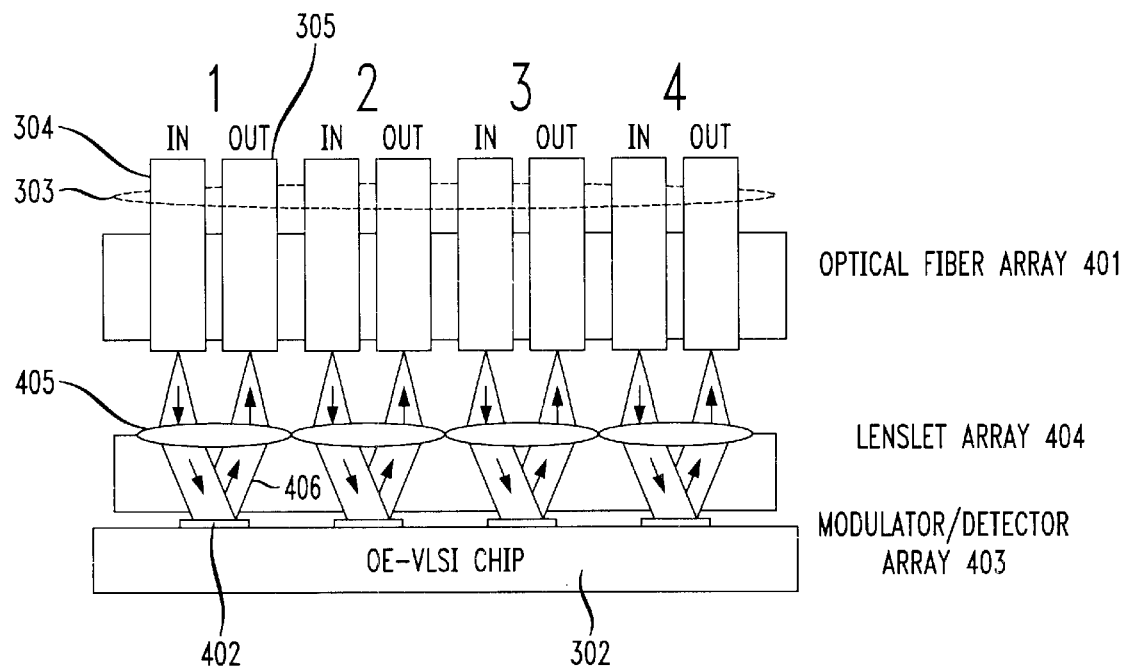
FIG. 4 shows an illustrative diagram of our optical fiber interface to the optical modulator and detector array of the switch unit.

With reference to FIG. 4, the OE-VLSI chip 302 is shown to include multiple optical transceivers 402 which interface to multiple fibers 303 via a fiber ribbon or 2-dimensional fiber array 401, to create a lower-cost solution and gracefully accommodate a large number of optical I/O data devices (such as 310 of FIG. 3 or the computer 100/NIC 101/ transceiver 102 combination of FIG. 1). Because a OE-VLSI chip can incorporate large numbers of optical transceivers (over 4000 optical modulators and detectors have been demonstrated), such an arrangement offers large potential size and cost reductions when utilized at the central switch unit 310

Our optical LAN of FIG. 3 is called a "Loop-Back" network because a light signal from a remote NIC transceiver 300 sent over an uplink optical fiber 304 is modulated by a MQW modulator 301 of OE-VLSI chip 302 at the switch unit 310 and sent over a downlink optical fiber 305 back to the NIC transceiver 300.

FIG. 4 shows an illustrative diagram of our optical fiber interface to the optical modulator and detector array 403 of the OE-VLSI chip 302 used at central switch unit 310. Illustratively, the optical interface is shown to include four optical fiber pairs 303 (i.e., four NIC transceivers 300) in optical fiber array 401. The lenslet array 404 is attached between optical fiber array 401 and OE-VLSI chip 302 so that light from each input (uplink) fiber 304, is collimated by one lenslet 405 reflects off one MQW modulator 402 and is only focused by lenslet 405 into the adjacent output (downlink) fiber.305. Our approach makes use of the capability of an MQW modulators 402 to serve both as a detector and as a modulator, depending on the electrical circuit connected (such an arrangement is described in U.S. Pat. No. 5,777,318, issued to A. Krishnamoorthy et al, and entiltled "Smart Pixel Array using Single Diode for Detection and Modulation" which is incorporated by reference herein and is also described in reference [3]. When MQW modulator/detector 402 is used as a detector, it detects the uplink data received over fiber 304 from the optical I/O unit 320 and outputs the detected signal to switch unit 310. When the MQW modulator/detector 402 is used as a modulator, it modulates the reflected optical carrier signal with data from the switch unit 310 and sends the resulting modulated downlink signal over fiber 305 to optical I/O unit 320.

Figure 6:
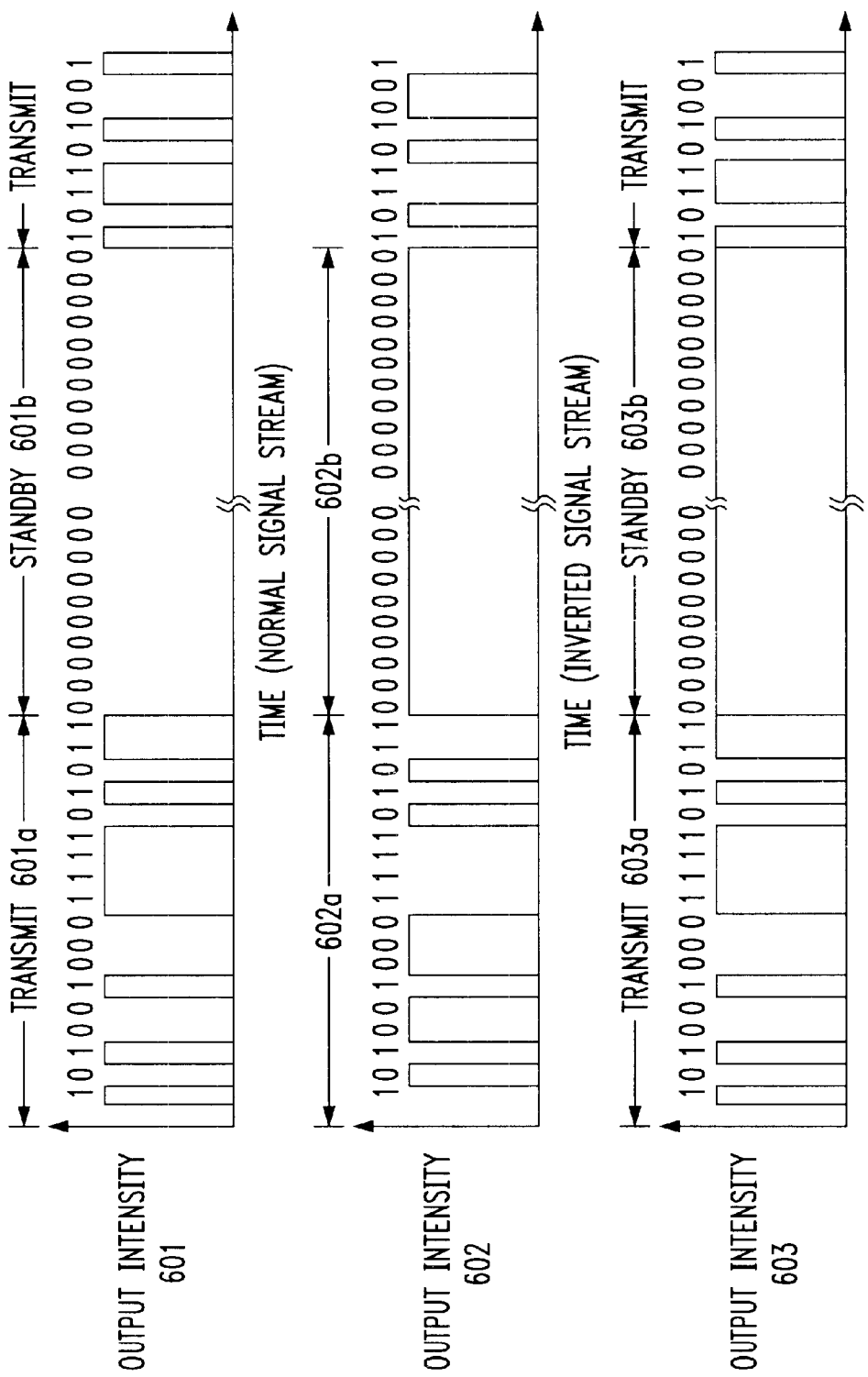
FIG. 6 shows an illustrative prior optical transceiver signal stream and two examples of the use of an inverted signal stream during the standby mode in accordance with our invention.

In accordance with another aspect of our invention, each of the NIC cards 300 used in our optical LAN of FIG. 3 is a standard design, commercially available NIC card 101 which has been modified so that when it is in a standby mode (not actively transmitting data) it emits a continuous optical uplink signal (602b of FIG. 6). This continuous optical uplink signal during the standby mode is used as an optical carrier signal which a modulator, e.g., 402, of switch unit 310 can modulate with downstream information to form a modulated downlink signal which is returned to the optical I/O unit 320.

Figure 5:
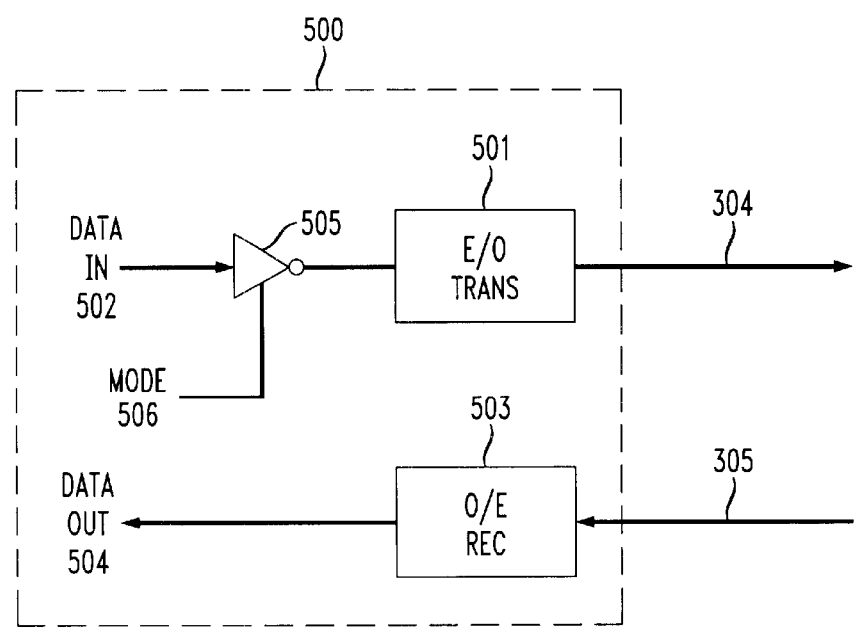
FIG. 5 shows an illustrative diagram of our modified optical transceiver unit of an NIC card for connecting over a pair of optical fibers to a switch unit.

With reference to FIG. 5, there is shown an illustrative simplified diagram of our optical transceiver unit 500 of an NIC card 300 for transmitting upstream optical data signals to switch unit 310. A simplified illustrative diagram of a transceiver 102 used with the prior art NIC card 101 included an optoelectonic transmitter (laser) 501 that, during a transmit mode, converted upstream electrical data signals 502 received from the NIC card 101 into a modulated optical signal for transmission over optical fiber 304 to switch unit 104. Illustratively, the modulated optical signal received over optical fiber 305 from switch unit 104, during a standby mode, was converted by optoelectronic receiver (detector) 503 to recover and output the downstream electrical data signal 504 to NIC 101.

With reference to 601 of FIG. 6, there is shown the optical data signals transmitted by transceiver 102 during the transmit mode 601a and during the standby mode 601b for the conventional LAN network arrangement of FIG. 1. As shown by 601, during the transmit mode 601a an upstream logical "I" data signal turns the laser of transmitter 501 "on" and a logic "0" data signal turns the laser "off." During the standby mode 601b, when any downstream information from the switch unit 104 would be sent to the NIC card 101, the laser is "off" and hence no light signal is present on upstream fiber 304.

With reference to 602, and in accordance with our invention, there is shown the optical data signals that are sent by our optical transceiver unit 500 during the transmit mode 602a and during the standby mode 602b by our LAN network arrangement of FIG. 3. As shown by 602, during the transmit mode 602a interval an upstream logical "I" data signal turns the laser of transmitter 501 "off" and a logic "0" data signal turns the laser "on." During the standby mode, a constant logic "0" or laser "on" signal (unmodulated optical carrier signal) is sent by optical transceiver unit 500 to the switch unit 310. In effect, the optical transceiver unit 500 in each of our NIC cards 300 is modified to reverse the polarity of the optical output; i.e., a logical "I", which normally means laser output "on", is converted to laser output "off". With reference to FIG. 5, one illustrative way in which this may be accomplished is by adding the inverter circuit 505 prior to the transmitter 501. As a result the optical signal is "off" for a logic "1" signal and vice-versa. Similarly, during the standby mode 602b, when any downstream information from the switch unit 310 would be received by the NIC card 300, the laser is "on" providing a source of light (i.e., an optical carrier signal) for the operation of the modulator 402 at the switch unit 310. It should be noted that the duration of the transmit and standby modes can be variable in time and can be negotiated by protocol. Note, since during the standby mode 602b the modulator at switch unit 310 has a source of light, conventional optical signaling (i.e., logic "1" is optical signal "on") can be maintained in the downstream direction from the switch card 310 to optical I/O unit 320.

With reference to 603, in another embodiment, conventional optical signal is maintained during the transmit mode (i.e., logic "1" is laser "on") and is inverted only during the standby mode 603b. In such an arrangement, a mode signal 506 is used to enable the inverter 505. Thus, during the transmit mode the inverter 505 is disabled so conventional signaling is maintained, but during the standby mode the mode signal enables the inverter 505 so that the inverse of conventional signaling occurs. This signaling is illustrated, respectively, by 603a which shows the conventional signaling during the transmit mode and 603b which shows the inverted signaling during the standby mode.

Note that the existing Ethernet LAN, FIG. 1, signaling standard calls for a periodic "1" to be transmitted even while the transceiver node is not actually transmitting data. This bit helps maintain the clock synchronization in the receiver at the switch unit 104. Thus, periodically a logic "1" signal is sent during the standby mode 601b of FIG. 6. If this requirement can not be eliminated, the transmitted signal from the switch unit 310 will have to be encoded in such a way as to anticipate and compensate for this condition.

The reflected (downstream) signal from the switch unit 310 to the NIC card 300 depends on the state of the MQW modulator/detector device 402. In general, an efficient detector absorbs most of the incident signal. Thus, when MQW device 402 is in its detector mode, any reflected downstream intensity of the upstream data by the MQW modulator/detector device will be small, and not create false data signals at the receiver of the NIC card 300.

Presently, MQW modulators/detectors 402 have a limited wavelength range which they can accept. Most NIC transmitters 300 optical signals will fall within this range, but it may be necessary to tune the modulator bias voltage independently on each modulator in the array 403. This can be accomplished with a set-up protocol running on software, but might also be accomplished automatically and continuously using a feedback circuit which maximizes the current swing for the received upstream data stream, as was discussed in the previously referenced Krishnamoorthy et al U.S. patent and also in greater detail in reference[4].

What has been described is merely illustrative of the application of the principles of the present invention. Other methods and arrangements can be implemented by those skilled in the art without departing from the spirit and scope of the present invention.

Appendix

References

1. A. Krishnamoorthy et al, "Vertical-Cavity Surface-Emitting Lasers Flip-Chip Bonded to Gigabit-per-Second CMOS Circuits," IEEE Photonics Letters, Vol. 11, No. 1, January 1999, pp 128–130.
2. A. Krishnamoorthy et al, "Optoelectronic-VLSI: Photonics Integrated with VLSI Circuits," IEEE Journal of Selected Topics in Quantum Electronics, Vol. 4, No. 6, November/December 1998, pp 899–912.
3. A. Krishnamoorthy et al, "Dual-Function Detector-Modulator Smart-Pixel Module," Applied Optics, Vol. 36, No. 20, Jul. 10, 1997, pp 4866–4870.
4. K. W. Goosen et al "On the Tolerance and Manufacturing Tolerances of GaAs-AIAs MQW Modulators," IEEE Journal of Quantum Electronics, Vol. 34, No. 3, March 1998, pp 431–438.

What is claimed is:

1. An optical communication network comprising
a plurality of remote optical transceiver units connected over a plurality of optical fibers to an optoelectronic switch unit wherein
each remote optical transceiver unit includes an optical signal source for transmitting a modulated optical upstream signal to said optoelectronic switch during a transmit mode, and during a standby mode transmitting an optical carrier signal and wherein
said optoelectronic switch includes a plurality of local transceivers, each local transceiver operating as a receiver during the transmit mode to receive the upstream optical signal over an optical fiber from one of the plurality of remote optical transceiver units and operating as a modulator during the standby mode to modulate a received optical carrier signal and transmitting the modulated downstream optical signal back to said one of the plurality of remote optical transceiver units.

2. The optical communication network of claim 1 wherein during the transmit mode a logical zero optical signal is represented by a presence of light and a logical one signal is represented by an absence of light.

3. The optical communication network of claim 1 wherein during the transmit mode a logical zero optical signal is represented by an absence of light and a logical one signal is represented by the presence of light.

4. The optical communication network of claim 1 wherein the optical carrier signal is sent during the standby mode by a remote optical transceiver unit in response to a received mode signal.

5. The optical communication network of claim 1 wherein each of the local transceivers includes a multiple quantum well (MQW) device.

6. The optical communication network of claim 5 wherein the MQW device is switchable for use as a modulator and as a detector.

7. The optical communication network of claim 5 wherein each MQW device is part of a Very Large Scale Integrated (VLSI) circuit.

8. The optical communication network of claim 1 wherein a pair of optical fibers connects one remote optical transceiver unit to one associated local transceiver.

9. The optical communication network of claim 8 wherein each pair of the optical fibers are part of a fiber array which connects through a lenslet array to said optoelectronic switch.

10. The optical communication network of claim 1 wherein the optoelectronic switch includes a lenslet array to couple received optical signals and modulated optical signals between the optical fibers and the plurality of local transceivers.

11. The optical communication network of claim 10 wherein a pair of optical fibers connects each remote optical transceiver unit to each local transceiver and wherein the lenslet array includes one lens for each fiber of each fiber pair.

12. The optical communication network of claim 11 wherein one fiber of each fiber pair outputs a received optical signal to its associated lenslet which collimates the optical signal for its associated local transceiver and wherein a second fiber of each fiber pair receives a focused modulated optical signal from its associated lenslet and said associated local transceiver.

13. The optical communication network of claim 1 wherein the transmit and standby modes are variable in time.

14. The optical communication network of claim 13 wherein the time duration of the transmit and standby modes are established by protocol between the plurality of remote optical transceiver units and the optoelectronic switch unit.

15. A method of operating an optical communication network including a plurality of optical units connected over a plurality of optical fibers to an optoelectronic switch, the method comprising the steps of:

at one of the plurality of optical units,
   during a transmit mode, transmitting a logical zero optical signal represented by the presence of light and transmitting a logical one signal represented by the absence of light and
   during a standby mode, transmitting said logic zero optical signal; and
at the optoelectronic switch
   during the transmit mode, operating as a receiver for receiving the optical signals and
   during the standby mode, operating as a modulator to modulate a received logic zero optical signal received from one of the plurality of optical units using a modulating signal and transmitting the modulated optical signal back to said one of the plurality of optical units.

16. An optical communication network comprising
a plurality of remote optical units connected over a plurality of optical fibers to an optoelectronic switch unit wherein
   each optical transceiver unit includes an optical signal source for transmitting, during a transmit mode, a logical zero optical signal represented by the presence of light and transmitting a logical one signal represented by the absence of light and for transmitting, during a standby mode, said logic zero optical signal and wherein
   said optoelectronic switch includes a plurality of transceivers, each transceiver during the transmit mode receiving optical signals over an optical fiber from one of the plurality of optical units and during the standby mode modulating a received logic zero optical signal using a modulating signal and transmitting the modulated optical signal back to said one of the plurality of optical units.

17. An optoelectronic switch unit comprising
a one-dimensional optical fiber array including a plurality of optical fiber pairs, each fiber pair having an uplink and a downlink fiber,
a one-dimensional lenslet array including a plurality of lenslets, each lenslet aligned with a different fiber pair, each lenslet collimating an upstream unmodulated optical carrier signal received over an uplink fiber of said aligned fiber pair onto a different local transceiver and for focusing a reflected signal from that local transceiver onto a downlink fiber of said aligned fiber pair, and
a plurality of local transceivers, each different local transceiver aligned with a different lenslet and arranged to
   operate as a receiver during a first mode to receive a modulated upstream optical signal from said aligned lenslet and to
   operate as a modulator during the second mode to modulate a reflection of an upstream unmodulated optical carrier signal received from said aligned lenslet to form said reflected signal which is sent back to said aligned lenslet.

* * * * *